United States Patent
Nagase

(10) Patent No.: US 10,678,229 B2
(45) Date of Patent: Jun. 9, 2020

(54) EQUIPMENT MONITORING SYSTEM, EQUIPMENT MONITORING PROGRAM, AND EQUIPMENT MONITORING METHOD

(71) Applicant: TLV Co., Ltd., Kakogawa-shi (JP)

(72) Inventor: Mamoru Nagase, Kakogawa (JP)

(73) Assignee: TLV Co., Ltd., Hyogo (JP)

( * ) Notice: Subject to any disclaimer, the term of this patent is extended or adjusted under 35 U.S.C. 154(b) by 303 days.

(21) Appl. No.: 15/501,619

(22) PCT Filed: Jul. 17, 2015

(86) PCT No.: PCT/JP2015/070573
§ 371 (c)(1),
(2) Date: Feb. 3, 2017

(87) PCT Pub. No.: WO2016/021395
PCT Pub. Date: Feb. 11, 2016

(65) Prior Publication Data
US 2017/0227953 A1    Aug. 10, 2017

(30) Foreign Application Priority Data

Aug. 4, 2014   (JP) ................. 2014-158719

(51) Int. Cl.
*G05B 23/00* (2006.01)
*G05B 23/02* (2006.01)

(52) U.S. Cl.
CPC ......... *G05B 23/0208* (2013.01); *G05B 23/02* (2013.01); *G05B 23/027* (2013.01); *G05B 23/0221* (2013.01)

(58) Field of Classification Search
CPC ...... G05B 23/02–0208; G01B 23/0208; G01B 23/02; G01B 23/0221; G01B 23/027
See application file for complete search history.

(56) References Cited

U.S. PATENT DOCUMENTS 5,852,793 A * 12/1998 Board .................... G01H 1/003
   702/56
6,571,180 B1 * 5/2003 Turner ..................... F16T 1/48
   702/182

(Continued)

FOREIGN PATENT DOCUMENTS

EP      1921527 A2   5/2008
JP     57182206 A   11/1982

(Continued)

*Primary Examiner* — Alexander A Mercado
(74) *Attorney, Agent, or Firm* — The Webb Law Firm

(57) ABSTRACT

An equipment monitoring system includes a control unit that switches a detection operation mode of a detector between a simple detection mode where the detector periodically performs a momentary detection operation, and a detailed detection mode where the detector performs a continuous detection operation. In the simple detection mode, a diagnosis unit diagnoses whether an operating state of monitored equipment is a normal state or a state requiring caution based on results of detection by the detector. In the simple detection mode, the control unit maintains the simple detection mode when the diagnosis unit has diagnosed that the operating state of the monitored equipment is a normal state, and switches the detection operation mode of the detector from the simple detection mode to the detailed detection mode when the diagnosis unit has diagnosed that the operating state of the monitored equipment is a state requiring caution.

12 Claims, 4 Drawing Sheets

(56) References Cited

U.S. PATENT DOCUMENTS

| | | |
|---|---|---|
| 2003/0154056 A1 | 8/2003 | Ito et al. |
| 2006/0074598 A1* | 4/2006 | Emigholz ............... C10G 47/36 702/185 |
| 2007/0025485 A1 | 2/2007 | Caselli et al. |
| 2008/0114571 A1 | 5/2008 | Campbell et al. |
| 2008/0167839 A1* | 7/2008 | Miller .................. C10G 11/187 703/2 |
| 2009/0125207 A1* | 5/2009 | Nomura .................... F02C 3/22 701/100 |
| 2011/0036424 A1 | 2/2011 | Oike et al. |
| 2012/0095622 A1 | 4/2012 | Lynch et al. |
| 2013/0151199 A1* | 6/2013 | Hadley ................ G05B 23/024 702/183 |
| 2015/0204760 A1* | 7/2015 | Bottcher ................ G01H 1/003 73/112.01 |
| 2015/0247783 A1* | 9/2015 | Kondo .................... G01M 7/00 702/39 |

FOREIGN PATENT DOCUMENTS

| | | | |
|---|---|---|---|
| JP | 7286892 | A | 10/1995 |
| JP | 11296224 | A | 10/1999 |
| JP | 2003131707 | A | 5/2003 |
| JP | 2003132476 | A | 5/2003 |
| JP | 2011060269 | A | 3/2011 |
| WO | 2012051578 | A2 | 4/2012 |

\* cited by examiner

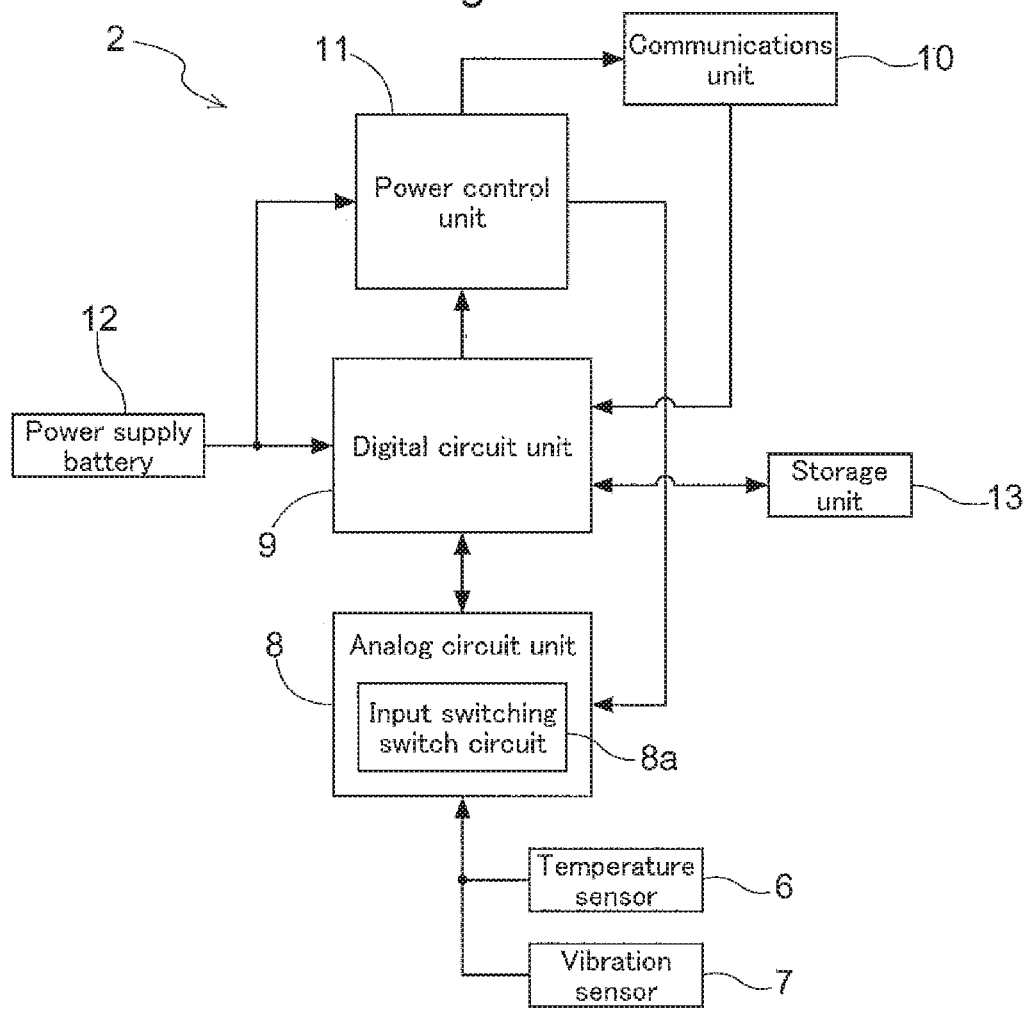
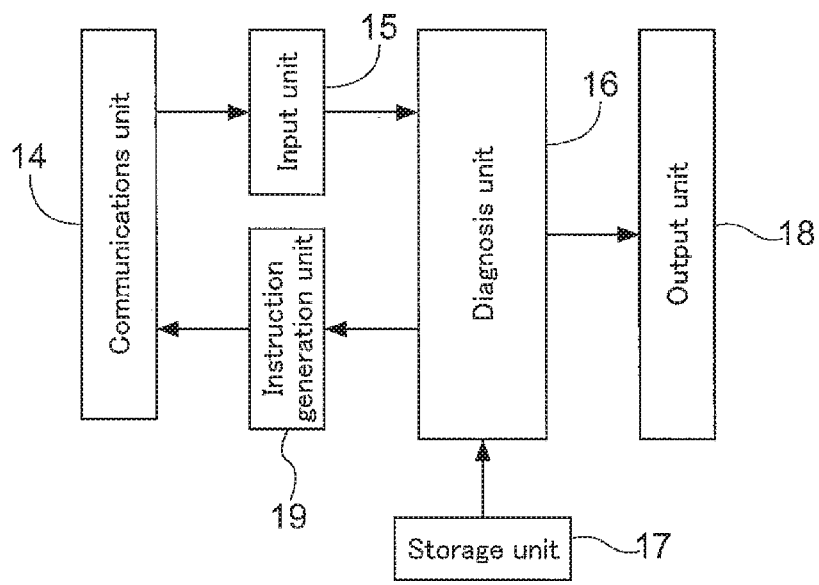

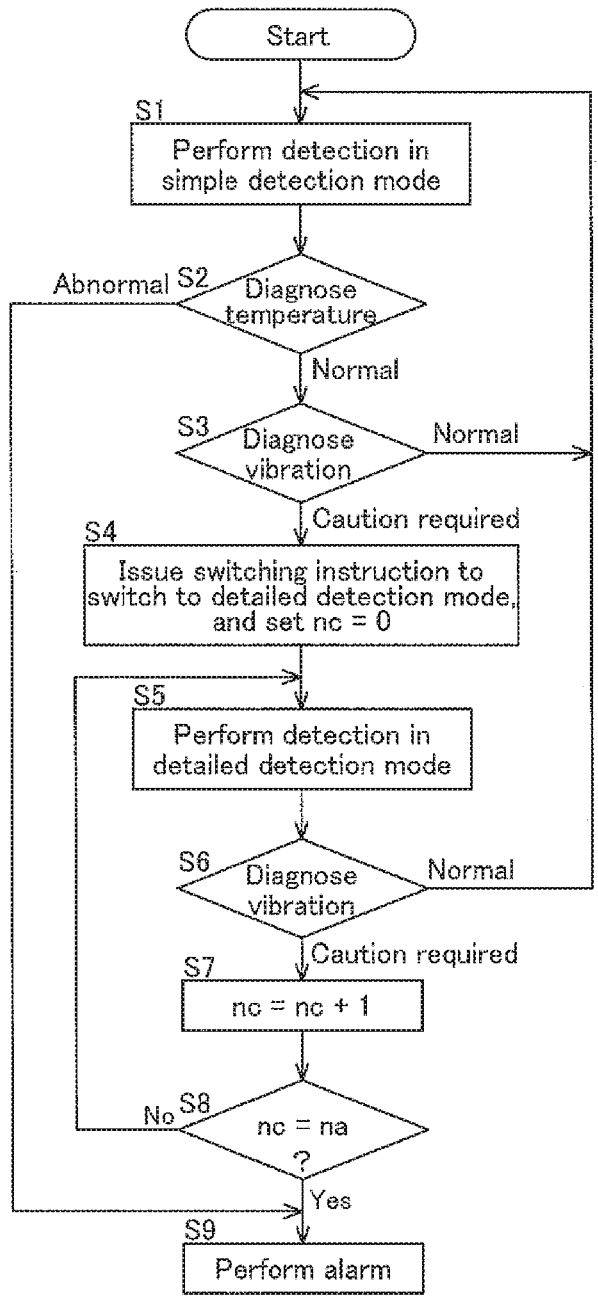

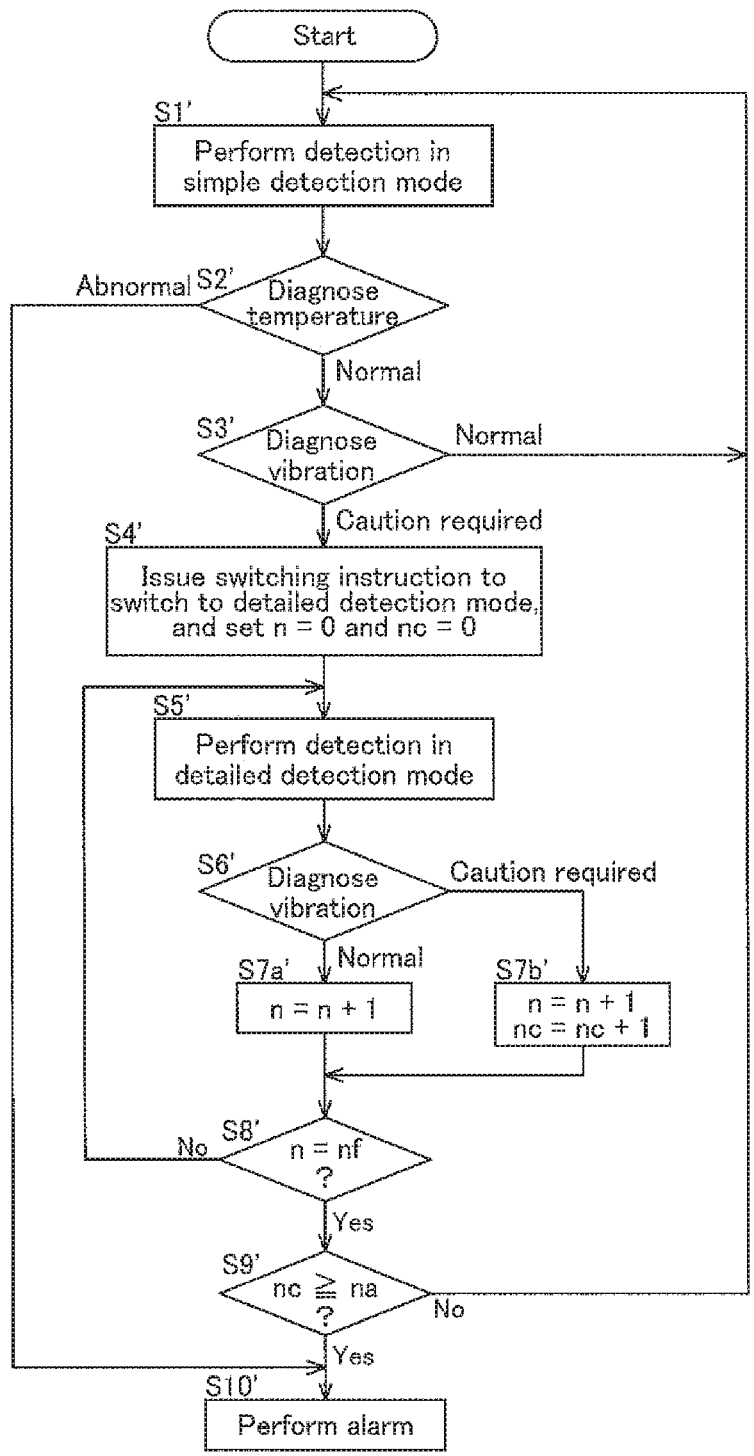

EQUIPMENT MONITORING SYSTEM, EQUIPMENT MONITORING PROGRAM, AND EQUIPMENT MONITORING METHOD

CROSS-REFERENCE TO RELATED APPLICATIONS

This application is the United States national phase of International Application No. PCT/JP2015/070573 filed Jul. 17, 2015, and claims priority to Japanese Patent Application No. 2014-158719 filed Aug. 4, 2014, the disclosures of which are hereby incorporated in their entirety by reference.

TECHNICAL FIELD

The present invention relates to an equipment monitoring system, an equipment monitoring program, and an equipment monitoring method detecting a physical quantity of monitored equipment, and diagnosing an operating state of the monitored equipment based on results of detection by a detector.

BACKGROUND ART

Conventionally, as this type of equipment monitoring system, for example, in Patent Document 1 an equipment monitoring system is disclosed in which, in order to reduce the power consumption of a detector (a terminal device in Patent Document 1) while constantly monitoring monitored equipment, the detector performs an intermittent detection operation in which the detector is basically set to a sleep state, and at predetermined time intervals, the detector is set to an awake state and performs a detection operation, and after the detection operation is completed, the detector is set to the sleep state until performing the next detection operation.

PRIOR ART DOCUMENTS

Patent Documents

Patent Document 1: JP 2003-131707A

DISCLOSURE OF THE INVENTION

Problem to be Solved by the Invention

However, in Patent Document 1, although an intermittent detection operation is performed, the question of how to accurately diagnose the operating state of the monitored equipment while suppressing power consumption is not considered.

That is, when attempting to suppress the power consumption of the detector, in an intermittent detection operation, it is conceivable to shorten the time of each detection operation to a momentary operation, and reduce detector start-up time. However, when adopting such a scheme, in a case where a physical quantity to be detected by the detector is a physical quantity that periodically changes and so variation in detection results is likely to occur, such as ultrasonic vibration or sound generated by the monitored equipment, even if detection results are diagnosed as abnormal, this is not necessarily caused by an abnormal operating state of the monitored equipment. It is possible that the operating state of the monitored equipment is normal, and diagnosis of an abnormal state is simply due to variation in the detection results. This is a problem for diagnosis reliability.

On the other hand, in order to accurately diagnose the operating state of the monitored equipment, it is conceivable to sufficiently lengthen the time of each detection operation, but when adopting such a scheme, although the reliability of diagnosis increases, the detector start-up time increases and so power consumption increases.

In consideration of these circumstances, a main aim of the present disclosure is to provide an equipment monitoring system, an equipment monitoring program, and an equipment monitoring method capable of suppressing the power consumption of a detector, and also capable of diagnosing the operating state of monitored equipment with high reliability.

Means for Solving Problem

An equipment monitoring system according to the present disclosure is an equipment monitoring system having a detector that detects a physical quantity of a monitored equipment, and a diagnosis unit that diagnoses an operating state of the monitored equipment based on detection results by the detector, the equipment monitoring system being provided with:

a control unit that switches a detection operation mode of the detector between a simple detection mode in which the detector periodically performs a momentary detection operation, and a detailed detection mode in which the detector performs a continuous detection operation;

wherein the diagnosis unit is configured to, in the simple detection mode, diagnose whether the operating state of the monitored equipment is a normal state or a state requiring caution based on the detection results by the detector, and the control unit is configured to, in the simple detection mode, when the diagnosis unit has diagnosed the operating state of the monitored equipment to be a normal state, maintain the simple detection mode, and when the diagnosis unit has diagnosed the operating state of the monitored equipment to be a state requiring caution, switch the detection operation mode of the detector from the simple detection mode to the detailed detection mode.

That is, in the above configuration, the detection operation of the detector is performed in two detection operation modes, namely a simple detection mode in which a momentary detection operation is performed periodically and a detailed detection mode in which a continuous detection operation is performed. First, in the simple detection mode, in order to find a sign of abnormality, simple diagnosis of whether the operating state of the monitored equipment is a normal state or a state requiring caution is performed, and when the result of diagnosis in the simple detection mode results is a state requiring caution (that is, when a sign of abnormality has been found), the detection operation mode of the detector is switched to the detailed detection mode, data is intensively collected by a continuous detection operation, and the operating state of the monitored equipment is diagnosed in detail.

Therefore, according to the above configuration, although power consumption is basically suppressed by performing a detection operation in the simple detection mode in which a momentary detection operation is performed, only in a case where the result of diagnosis in the simple detection mode is that the operation state is a state requiring caution, a detection operation is performed in the detailed detection mode in which power consumption is increased due to a continuous detection operation, so overall power consumption of the detector can be effectively suppressed. Also, because a momentary detection operation is performed, in the simple detection mode, even if it is difficult to distinguish whether the diagnosis results are due to an abnormal operating state of the monitored equipment, or whether the operating state of the monitored equipment is normal and the sign of abnormality is simply due to variation in the detection results, a detection operation is performed in the detailed detection mode, and those detection results are diagnosed in detail, so ultimately it is possible to reliably diagnose whether the operating state of the monitored equipment is a normal state or an abnormal state.

That is, according to the above configuration, detector power consumption can be effectively suppressed, and the operating state of the monitored equipment can be reliably diagnosed.

Below, preferable modes of a steam-using facility evaluation system according to the present disclosure will be described. However, the scope of the present disclosure is not limited by the exemplary preferred embodiments described below.

As one mode, preferably the diagnosis unit is configured to, in the detailed detection mode, repeatedly diagnose whether the operating state of the monitored equipment is a normal state or a state requiring caution based on the detection results by the detector in a predetermined time period, and when the operating state of the monitored equipment is diagnosed to be a state requiring caution for a predetermined number of times of abnormality recognition consecutively in this repetition, diagnose that the operating state of the monitored equipment is an abnormal state.

That is, according to the above configuration, in the detailed detection mode, the operating state of the monitored equipment is diagnosed based on the detection results collected by the continuous detection operation, so diagnosis is performed with higher reliability than diagnosis in the simple detection mode, and furthermore, the operating state of the monitored equipment is diagnosed to be an abnormal state after repeatedly confirming the certainty of diagnosis by repeating this highly reliable diagnosis, so it is possible to diagnose the operating state of the monitored equipment with extremely high reliability.

Note that the predetermined time period in the above configuration is not fixed, and may be appropriately modified according to the number of times diagnosis is repeated, for example by lengthening that time period each time diagnosis is repeated.

Also, the pattern of detection operation in the detector, a detection operation may be suspended after performing a continuous detection operation for a predetermined time period, and resumed after the diagnosis unit finishes diagnosis, or a continuous detection operation may be constantly performed without pausing after performing a detection operation for a predetermined time period.

As one mode, preferably the control unit is configured to, in the repetition of diagnosis by the diagnosis unit in the detailed detection mode, when the diagnosis unit has diagnosed the operating state of the monitored equipment to be a normal state, switch the detection operation mode of the detector from the detailed detection mode to the simple detection mode.

That is, although reliable diagnosis can be performed by performing a continuous detection operation in the detailed detection mode, to that extent the power consumption increases in comparison to the detection operation of the simple detection mode, but according to the above configuration, in the repeated diagnosis in the detailed detection mode, when the diagnosis unit has diagnosed the operating state of the monitored equipment to be a normal state, diagnosis repetition is stopped, and the detection operation mode of the detector is immediately switched to the simple detection mode in which power consumption is suppressed, so it is possible to effectively suppress detector power consumption due to performing a detection operation by the detailed detection mode.

As one mode, preferably the diagnosis unit is configured to, in the detailed detection mode, repeatedly diagnose whether the operating state of the monitored equipment is a normal state or a state requiring caution based on the detection results by the detector in a predetermined time period, and when, after a predetermined number of times of diagnosis have been performed in this repetition, a number of times that the operating state of the monitored equipment has been diagnosed to be a state requiring caution is at least a predetermined number of times of abnormality recognition, diagnose that the operating state of the monitored equipment is an abnormal state.

In the detailed detection mode, the operating state of the monitored equipment is diagnosed based on the detection results collected by the continuous detection operation, so diagnosis is performed with higher reliability than diagnosis in the simple detection mode, and furthermore, a format is adopted in which this reliable diagnosis is repeated a predetermined number of times and diagnosis is performed based on the predetermined number of times of diagnosis results, so it is possible to diagnose the operating state of the monitored equipment with extremely high reliability.

Note that the predetermined time period in the above configuration is not fixed, and may be appropriately modified according to the number of times diagnosis is repeated, for example by lengthening that time period each time diagnosis is repeated.

Also, regarding the pattern of detection operation in the detector, a detection operation may be suspended after performing a continuous detection operation for a predetermined time period, and resumed after the diagnosis unit finishes diagnosis, or a continuous detection operation may be constantly performed without pausing after performing a detection operation for a predetermined time period.

As one mode, preferably the detector is configured to be capable of detecting a physical quantity of a first group and a physical quantity of a second group, the diagnosis unit is configured to, in the simple detection mode, diagnose whether the operating state of the monitored equipment is a normal state or an abnormal state regarding the physical quantity of the first group, and when the diagnosis unit has diagnosed the operating state of the monitored equipment to be a normal state regarding the physical quantity of the first group, diagnose whether the operating state of the monitored equipment is a normal state or a state requiring caution regarding the physical quantity of the second group, and the control unit is configured to, in the simple detection mode, when the diagnosis unit has diagnosed the operating state of the monitored equipment to be a normal state regarding the physical quantity of the second group, maintain the simple detection mode, and when the diagnosis unit has diagnosed the operating state of the monitored equipment to be a state requiring caution regarding the physical quantity of the second group, switch the detection operation mode of the detector from the simple detection mode to the detailed detection mode.

The type of abnormality that can be detected in an operating state of a monitored equipment differs depending on the physical quantity to be detected, so it is preferable that a detector can detect a plurality of physical quantities in order to perform comprehensive diagnosis of the operating state of the monitored equipment. However, the physical quantities to be detected include both those that change periodically and are likely to vary in detection results (for example, ultrasonic vibration or sound), and those that change little over time and are less likely to vary in detection results (for example, temperature). For physical quantities more likely to vary in detection results, in order to increase the reliability of diagnosis, it is necessary to perform diagnosis based on the detection results in a detection operation collected over some amount of time. On the other hand, for physical quantities less likely to vary in detection results, sufficiently reliable diagnosis is possible with the detection results in a momentary detection operation.

In other words, for physical quantities more likely to vary in detection results, the reliability of diagnosis is insufficient with the detection results of the simple detection mode, so it is necessary to perform diagnosis based on the detection results of the detailed detection mode in order to perform reliable diagnosis. On the other hand, for physical quantities that are less likely to vary in detection results, sufficiently reliable diagnosis can be performed with the detection results of the simple detection mode, and if a further detection operation is performed in the detailed detection mode, power is wastefully consumed. In this way, if diagnosis is performed in the same pattern for both a physical quantity that is more likely to vary in detection results and a physical quantity that is less likely to vary in detection results, in at least one case wasteful power consumption will occur, or the reliability of diagnosis will decrease.

Consequently, in the above configuration, the diagnosis pattern in which the detector detects a physical quantity is divided into two patterns. Regarding the physical quantity of the first group, only diagnosis based on the detection results in the simple detection mode is performed, without switching to the detailed detection mode, and regarding the physical quantity of the second group, in addition to the diagnosis based on the detection results in the simple detection mode, diagnosis based on the detection results in the detailed detection mode is also performed. That is, according to the above configuration, assuming the physical quantity of the first group is a physical quantity that is less likely to vary in detection results, while reliable diagnosis can be performed with only the diagnosis in the simple detection mode, power consumption can be effectively suppressed by omitting a detection operation or diagnosis in the detailed detection mode. At the same time, assuming the physical quantity of the second group is a physical quantity that is more likely to vary in detection results, although power consumption is effectively suppressed by basically performing a detection operation in the simple detection mode, ultimately diagnosis is performed based on the detection results in the detailed detection mode, so sufficiently reliable diagnosis is possible. In this way, according to the above configuration, even in a case where respective diagnosis is performed based on detection results of a physical quantity that is more likely to vary in detection results and a physical quantity that is less likely to vary in detection results, it is possible to effectively suppress detector power consumption, and possible to reliably diagnose the operating state of the monitored equipment.

As one mode, preferably the diagnosis unit is configured to, in the simple detection mode, regarding the physical quantity of the first group, diagnose the operating state of the monitored equipment based on detection results in one instance of detection operation, and regarding the physical quantity of the second group, diagnose the operating state of the monitored equipment based on a moving average of detection results in a plurality of instances of detection operation.

That is, in the above configuration, regarding the physical quantity of the second group, the operating state of the monitored equipment is diagnosed based on the moving average of the detection results in a plurality of instances of detection operation, so regarding the physical quantity of the second group in the simple detection mode, it is possible to increase the reliability of the diagnosis of whether the operating state of the monitored equipment is a normal state or a state requiring caution. Also, by increasing the reliability of diagnosis, unnecessary switching to the detailed detection mode, which increases power consumption, can be reduced, so power consumption can be even more effectively suppressed.

As one mode, preferably the physical quantity of the first group includes temperature.

That is, because temperature changes little over time and is less likely to vary in detection results, temperature can be diagnosed with sufficient reliability with only the detection results in the simple detection mode in which a momentary detection operation is performed. Therefore, according to the above configuration, temperature is adopted as the physical quantity of the first group regarding which diagnosis is only performed based on the detection results in the simple detection mode, so it is possible to perform a detection operation pattern and diagnosis that are suitable for temperature.

As one mode, preferably the physical quantity of the second group includes ultrasonic vibration or sound.

That is, because ultrasonic vibration and sound change periodically and are more likely to vary in detection results, in order to perform reliable diagnosis it is necessary to perform diagnosis based on the detection results in the detailed detection mode. Therefore, according to the above configuration, ultrasonic vibration or sound is adopted as the physical quantity of the second group, regarding which diagnosis is performed based on the detection results in the simple detection mode, and additionally based on the detection results in the detailed detection mode, so it is possible to perform a detection operation pattern and diagnosis that are suitable for ultrasonic vibration or sound.

As one mode, preferably the diagnosis unit is configured to diagnose the operating state of the monitored equipment based on a size relationship of detection results to a predetermined threshold value.

That is, according to the above configuration, it is possible to simply diagnose the operating state of the monitored equipment with a simple unit that only calculates the size relationship of detection results to a predetermined threshold value.

As one mode, preferably the threshold value is set to a maximum value or a minimum value of detection results that can be detected by the detector in test operation of the detector.

That is, according to the above configuration, the operating state of the monitored equipment is diagnosed based on a maximum value or a minimum value of detection results that can be detected in test operation performed in advance, so it is possible to reliably diagnose whether or not the detection results are within the normal range.

As one mode, preferably the threshold value is set for each detector based on a range of variation in detection results that were detected in a fixed period in initial operation of the detector.

That is, according to the above configuration, a threshold value according to the actual circumstances of each monitored equipment, such as installation location, can be set for each monitored equipment, so it is possible to diagnose the operating state according to each monitored equipment.

As one mode, preferably the threshold value is updated at an appropriate time for each detector based on a range of variation in detection results that were detected in a fixed period during operation of the detector.

That is, according to the above configuration, after setting the threshold value in initial operation, the threshold value is updated at an appropriate time for each detector according to changes in actual circumstances of each monitored equipment due to continuous operation, so it is possible to diagnose the operating state according to each monitored equipment in consideration of also changes after operation.

As one mode, preferably an alarm unit is provided that issues an alarm when the operating state of the monitored equipment has been diagnosed to be an abnormal state by the diagnosis unit.

That is, according to the above configuration, an alarm is issued when the operating state of the monitored equipment has been diagnosed to be an abnormal state, so it is possible to quickly remedy an abnormality of the operating state of the monitored equipment.

An equipment monitoring program according to the present disclosure is an equipment monitoring program causing a detector to detect a physical quantity of a monitored equipment, and causing a diagnosis unit to diagnose an operating state of the monitored equipment based on detection results by the detector, the equipment monitoring program including:

causing the detector to perform a detection operation of a simple detection mode in which a momentary detection operation is periodically performed; and causing the diagnosis unit to diagnose whether the operating state of the monitored equipment is a normal state or a state requiring caution based on the detection results by the detector;

wherein when the diagnosis unit has diagnosed the operating state of the monitored equipment to be a normal state, the simple detection mode is maintained and the detector is caused to perform a detection operation, and when the diagnosis unit has diagnosed the operating state of the monitored equipment to be a state requiring caution, the detection operation mode of the detector is switched from the simple detection mode to a detailed detection mode in which a continuous detection operation is performed and the detector is caused to perform a detection operation.

That is, according to the above configuration, it is possible to execute a preferable embodiment of an equipment monitoring system according to the present disclosure, and thus, it is possible to effectively obtain the above-described working effects that can be obtained with an equipment monitoring system according to the present disclosure.

An equipment monitoring method according to the present disclosure is an equipment monitoring method of detecting a physical quantity of a monitored equipment with a detector, and diagnosing an operating state of the monitored equipment based on detection results by the detector, the equipment monitoring method including:

performing, with the detector, a detection operation of a simple detection mode in which a momentary detection operation is periodically performed; and diagnosing whether the operating state of the monitored equipment is a normal state or a state requiring caution based on the detection results by the detector;

wherein when the operating state of the monitored equipment has been diagnosed to be a normal state, the simple detection mode is maintained and a detection operation is performed by the detector, and when the operating state of the monitored equipment has been diagnosed to be a state requiring caution, the detection operation mode of the detector is switched from the simple detection mode to a detailed detection mode in which a continuous detection operation is performed and a detection operation is performed by the detector.

That is, according to the above configuration, it is possible to execute a preferable embodiment of an equipment monitoring system according to the present disclosure, and thus, it is possible to effectively obtain the above-described working effects that can be obtained with an equipment monitoring system according to the present disclosure.

BRIEF DESCRIPTION OF THE DRAWINGS

FIG. 3 is a block diagram showing the configuration of the detector.

FIG. 4 is a block diagram showing the configuration of a central management apparatus.

FIG. 5 is a flowchart of equipment monitoring by an equipment monitoring system.

FIG. 6 is a flowchart of equipment monitoring by an equipment monitoring system.

BEST MODE FOR CARRYING OUT THE INVENTION

Figure 1:
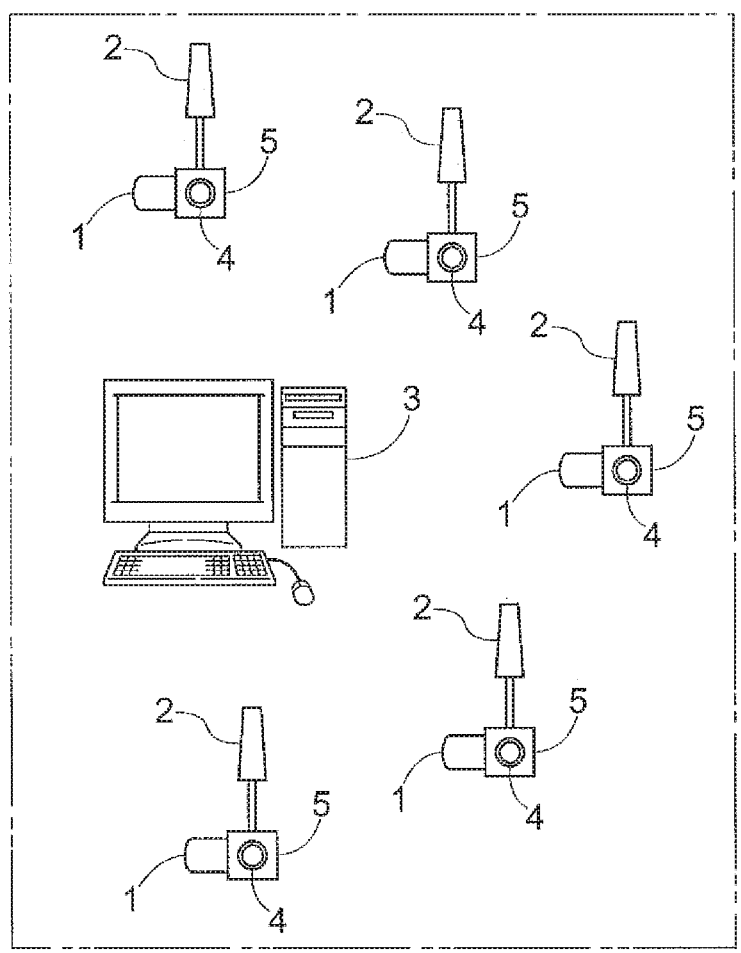
FIG. 1 is a schematic plan view of an equipment monitoring system.

FIG. 1 shows an equipment monitoring system that, with a large number of steam traps 1 deployed dispersed in a factory, a plant, or the like serving as monitored equipment, monitors the state of the steam traps 1. The equipment monitoring system is configured with detectors 2 that are provided in each steam trap 1 serving as monitored equipment and detect a physical quantity of the steam trap, a diagnosis unit that diagnoses the operating state of each steam trap 1 based on the results of detection by each detector 2, and a central management apparatus 3 having an alarm unit that gives an alarm based on diagnosis results.

Figure 2:
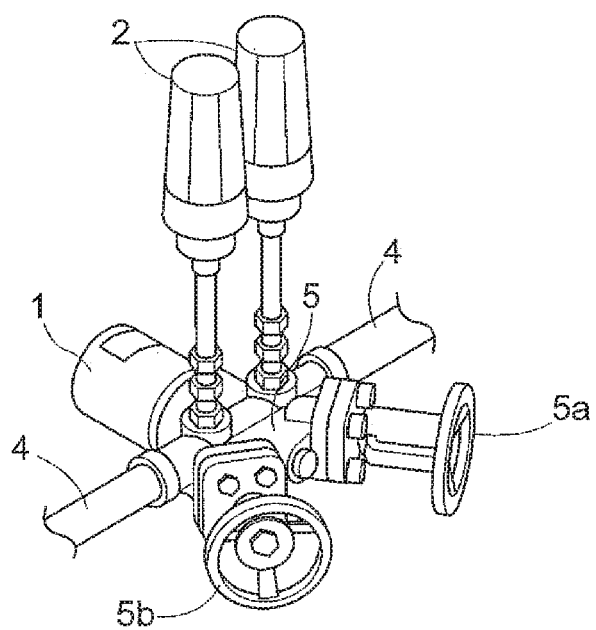
FIG. 2 is a perspective view showing a detector.

As shown in FIG. 2, for example, two detectors 2 are provided in a connecting member 5 for steam trap connection interposed in a steam pipe 4. Through this connecting member 5, each detector 2 respectively detects the physical quantity of the steam trap 1. An unshown entrance path and exit path are provided inside the connecting member 5, and the entrance and the exit of the steam trap 1 are in communication with the steam pipe 4 on both sides of the connecting member 5 through the entrance path and the exit path of the connecting member 5. Also, in order to prevent steam from flowing into the steam trap 1 or the exit side of steam pipe 4 when not using steam-using equipment to which steam is supplied or when exchanging steam traps, an entrance valve 5a serving as a gate valve of the entrance path and an exit valve 5b serving as a gate valve of the exit path are provided in the connecting member 5. Also, the detectors 2 are provided on the entrance side and the exit side respectively of the connecting member 5. Note that the detectors 2 may also be provided not in the connecting member 5, but in the steam trap 1 or in the steam pipe 4 in the vicinity of the steam trap 1, and the quantity of detectors is not limited to two. One, or three or more of the detectors may be provided.

As shown in FIG. 3, each detector 2 is configured with a temperature sensor 6 that detects the temperature in the steam trap 1, a vibration sensor 7 that detects ultrasonic vibration generated from the steam trap 1, an analog circuit unit 8 connected to the temperature sensor 6 and the vibration sensor 7, a digital circuit unit 9 employing a microprocessor and serving as a control unit, a communications unit 10 that sends/receives information to/from the central management apparatus 3, a power control unit 11 that controls power supply to the analog circuit unit 8 and the communications unit 10, a power supply battery 12, and a storage unit 13 that stores settings information or the like. Also, the analog circuit section 8 is provided with an input switching switch circuit 8a that sequentially inputs detection results of the plurality of sensors 6 and 7.

Next is a description from detection of temperature/vibration of the steam trap 1 by the detectors 2 until sending detection results to the central management apparatus 3. First, as a detection operation by the detectors 2, the digital circuit unit 9, according to settings information that has been conferred in wireless communications from the central management apparatus 3, periodically changes the analog circuit unit 8 from the sleep state to the awake state by power supply control by the power control unit 11, and inputs detection results of the temperature sensor 6 and the vibration sensor 7 that are detectable during the awake state (in a case where both temperature and vibration are detected, the detection results of the plurality of connected sensors 2 are sequentially input by operation of the input switching switch circuit 8a by the digital circuit unit 9). After this input processing, the digital circuit unit 9 returns the analog circuit unit 8 to the sleep state again by power supply control by the power control unit 11.

Note that here, the settings information conferred from the central management apparatus 3 relates to operation of the input switching switch circuit 8a, such as the operation time of the detection operation (that is, the time period to set the analog circuit unit 8 to the awake state), or the time interval of the detection operation (that is, a time interval in which the analog circuit unit 8 is switched from the sleep state to the awake state).

Then, the sensor detection results that were input are processed by the digital circuit unit 9, and afterward, as a communications operation by the detectors 2, the digital circuit unit 9, according to the settings information conferred by wireless communications from the central management apparatus 3, similar to the analog circuit unit 8, switches the communications unit 10 from the sleep state to the awake state by power supply control by the power control unit 11, sends the sensor detection results processed by the digital circuit unit 9 to the central management apparatus 3, and also receives instruction information from the central management apparatus 3. After this communications processing, the digital circuit unit 9 returns the communications unit 10 to the sleep state again by power supply control by the power control unit 11.

Note that here, the settings information conferred from the central management apparatus 3 relates to the timing of the communications operation (such as whether to perform a communications operation for each input processing of sensor detection results to the digital circuit unit 9, or whether to perform a communications operation whenever input processing of sensor detection results has been performed a predetermined number of times).

Also, when the communications unit 10 has received a signal from the central management apparatus 3 addressed to itself while in the sleep state, the digital circuit unit 9 of each detector temporarily sets the communications unit 10 to the awake state in order to respond to the received signal.

Thus, in this equipment monitoring system, in detection operation by the detectors 2 and sending of detection results to the central management apparatus 3, by setting the analog circuit unit 8 and the communications unit 10 to the awake state by supply power control only when necessary, power consumption is reduced, and this makes it unnecessary to replace the power supply battery 12 over a long period of time.

The central management apparatus 3 is configured from a computer and peripheral equipment and the like thereof, and as shown in FIG. 4, is configured from a communications unit 14 that communicates with each detector, an input unit 15 to which detection results sent from each detector 2 can be input, a diagnosis unit 16 that diagnoses the operating state of each steam trap 1 based on detection results that have been input, a storage unit 17 storing various information such as threshold values for temperature and vibration respectively in diagnosis of the operating state of each steam trap 1, position information of each steam trap 1, and the like, an output unit 18 that outputs the diagnosis results and the like of steam trap 1, and an instruction generation unit 19 that generates an instruction to a detector 2 based on diagnosis results.

Diagnosis of the operating state of each steam trap 1 in the diagnosis unit 16 of the central management apparatus 3 is performed by, for each detection result of temperature and vibration that has been input to the input unit 15, performing comparison to the threshold values of temperature and vibration respectively that have been stored in the storage unit 17. The diagnosis unit 16 diagnoses whether the operating state of the steam trap 1 is a normal state or an abnormal state based on the detection results regarding temperature, and diagnoses whether the operating state of the steam trap 1 is a normal state or a state requiring caution based on the detection results regarding vibration, and when diagnosed a predetermined number of times (a number of times of abnormality recognition na) consecutively that the operating state of the steam trap 1 is a state requiring caution, the operating state of the steam trap 1 is diagnosed to be an abnormal state. The reason for this is that regarding temperature, detection results are less likely to vary, so it is possible to reliably diagnose whether the operating state of steam trap 1 is a normal state or an abnormal state with one diagnosis, but regarding vibration, because detection results are more likely to vary, the operating state of the steam trap 1 is not immediately diagnosed as an abnormal state when the detection results are not normal, but rather, when the detection results are not normal, it is necessary to diagnose the operating state of the steam trap 1 as a state requiring caution, and afterward, ultimately diagnose whether the operating state of the steam trap 1 is a normal state or an abnormal state in a plurality of instances of diagnosis.

In diagnosis of whether the operating state of the steam trap 1 is a normal state or an abnormal state, or a normal state or a state requiring caution, regarding temperature, the operating state of the steam trap 1 is diagnosed to be an abnormal state when detection results are lower than the threshold value, and the operating state of the steam trap 1 is diagnosed to be a normal state when detection results are not lower than the threshold value. A state in which the detection results of temperature are lower than the threshold value, that is, a state of low temperature abnormality, indicates a clogged abnormal state in which drain discharge is not being appropriately performed in the steam trap 1. Regarding vibration, the operating state of the steam trap 1 is diagnosed to be a state requiring caution when detection results are higher than the threshold value, and the operating state of the steam trap 1 is diagnosed to be a normal state when detection results are not higher than the threshold value. A state in which the vibration detection results are higher than the threshold value means that vibration caused by steam leakage in the steam trap 1 has been detected, and indicates that the steam trap 1 is leaking steam.

Note that the threshold value for temperature can be appropriately set to a temperature sufficient to diagnose a low temperature abnormality. Also, the threshold value for vibration can be set to a maximum value of detection results detected when the steam trap 1 is operated in a normal operating state in testing in advance. This makes it possible to reliably diagnose whether or not the detection results are within the normal range. The threshold value for vibration may also be set for each detector 2 based on the variation range of the detection results detected in a fixed period in initial operation of the detector 2. This makes it possible to diagnose the operating state of each steam trap 1 according to the actual circumstances of each steam trap 1, such as installation location. Also, the threshold value may be reset based on the variation range of the detection results detected in a fixed period by each detector 2 not only in initial operation, but also during operation of the detector 2, and this makes it possible to perform a diagnosis of the operating state according to each monitored equipment, taking into consideration also changes after operation.

When the operating state of the steam trap 1 has been diagnosed in the diagnosis unit 16, an instruction (for example, such as switching of the detection operation mode, described later) to the corresponding detector 2 is generated by the instruction generation unit 19 based on the diagnosis results, and an instruction based on the diagnosis results is sent to the corresponding detector 2 by the communications unit 14. Also, when the operating state of steam trap 1 has been diagnosed as an abnormal state, referring to the storage unit 17, information including an identification code and an installation location of the steam trap 1 that is provided in the detector 2 that is the sending source of detection information, the occurring abnormality type (such as a steam leakage abnormality or a clogged abnormality), and the like, is output as an alarm to the output unit 18. Further, as necessary, a predetermined alarm may also be performed in which, for example, a manager of a factory, a plant, or the like is notified of the presence of an abnormal trap 1 by an unshown alarm unit (corresponding to the alarm unit), or notification of the presence of an abnormal trap 1, information regarding the cause and remedy of the abnormality, and the like are sent by the communications unit 14 (corresponding to the alarm unit) to a communications terminal such as a computer or a portable telephone of a manager or a management contractor of a factory, a plant, or the like. Also, when the operating state of steam trap 1 has been diagnosed as an abnormal state, in order to confirm whether a low temperature abnormality is caused simply by steam not entering the monitored steam trap 1, the manager directly checks the valve or the like on the upstream side of the steam trap 1, or performs a check by acquiring equipment state information of the monitored valve or the like.

Although this equipment monitoring system is configured as described above, in this equipment monitoring system, furthermore, a configuration is adopted in which the detector 2, by control of the digital circuit unit 9, appropriately switches, according to an instruction from the central management apparatus 3, the detection operations of two detection operation modes, a simple detection mode in which a momentary detection operation is periodically performed and a detailed detection mode in which a continuous detection operation is performed, the modes having different operation times and time intervals of their respective detection operations. Also, basically, a configuration is adopted in which the detector 2 performs a detection operation in the simple detection mode and performs a simple diagnosis by the diagnosis unit 16 of the central management apparatus 3, and when the result of diagnosis is a state requiring caution in the simple detection mode (that is, a sign of abnormality has been found), the detection operation mode of the detector 2 is switched to the detailed detection mode, data is intensively collected by a continuous detection operation, and the operating state of the steam trap 1 is diagnosed in detail. Also, a configuration is adopted in which, when the diagnosis unit 16 diagnoses the detection results in the detailed detection mode, a count is performed of a number of times requiring caution nc, which is the number of times that the result of diagnosis is a state requiring caution.

Also, as described later, regarding temperature, the detection results are less likely to vary, so the central management apparatus 3 serving as the diagnosis unit is capable of sufficiently reliable diagnosis even if there are few detection results, and therefore, a configuration is adopted in which a small number of detection results are input in the simple detection mode, and temperature is not detected in the detailed detection mode.

In the simple detection mode and the detailed detection mode, for example, each detector 2 is set to perform the following operations.

Simple Detection Mode (1) At intervals of 1 second (more specifically, with the time interval of the start time of each detection operation at 1 second intervals), a momentary detection operation having an operation time in milliseconds is performed periodically 60 times, and the inputted detection results (temperature/vibration) are processed by the digital circuit unit 9 and stored in the storage unit 13. Here, the input switching switch circuit 8a operates such that out of the 60 times, detection results of both temperature and vibration are input only for the first instance of detection operation, and for the other detection operations, only detection results of vibration are input.

(2) After performing a detection operation 60 times (that is, every minute), the digital circuit unit 9 calculates a moving average of the 60 detection results of vibration stored in the storage unit 13, and sends the moving average data as the vibration detection results together with the temperature detection results to the central management apparatus by the communications unit 10.

(3) After sending the detection results, the detection results stored in the storage unit are deleted.

(4) An instruction from the central management apparatus 3 is awaited, and if there is an instruction from the central management apparatus 3 to continue the simple detection mode, (1) to (3) are repeated, and if there is an instruction to switch to the detailed detection mode, the detection operation mode is switched to the detailed detection mode.

Detailed Detection Mode (a) The input switching switch circuit 8a performs a continuous detection operation for 15 seconds, and the detection results (vibration) inputted to the digital circuit unit 9 are processed by the digital circuit unit 9. Here, the input switching switch circuit 8a operates such that only the detection results of vibration are input.

(b) The processed detection results are sent to the central management apparatus by the communications unit 10.

(c) An instruction from the central management apparatus 3 is awaited, and if there is an instruction to continue the detailed detection mode, the detector 2 returns to (a), and if there is an instruction to switch to the simple detection mode, the detection operation mode is switched to the simple detection mode.

Diagnosis of the operating state of a steam trap 1 in this equipment monitoring system is performed according to the flowchart shown in FIG. 5, for example. First, in step S1, the detector 2 performs the detection operation of the simple detection mode and sends the detection results to the central management apparatus 3. Thereafter, the process proceeds to step S2.

In step S2, the diagnosis unit 16 of the central management apparatus 3 first performs diagnosis regarding the temperature detection results among the detection results of the simple detection mode that have been sent from the detector 2. When diagnosed that the operating state of the steam trap 1 is an abnormal state based on the temperature detection results, the process proceeds to step S9. When diagnosed that the operating state of the steam trap 1 is a normal state based on the temperature detection results, the process proceeds to step S3.

In step S3, the diagnosis unit 16 of the central management apparatus 3 performs diagnosis regarding the vibration detection results among the detection results of the simple detection mode that have been sent from the detector 2. When diagnosed that the operating state of the steam trap 1 is a normal state based on the vibration detection results, the instruction generation unit 19 generates an instruction to continue the simple detection mode, the communications unit 14 sends the generated instruction to the corresponding detector 2, and the process returns to step S1. When diagnosed that the operating state of the steam trap 1 is a state requiring caution based on the vibration detection results, the process proceeds to step S4.

In step S4, the instruction generation unit 19 generates an instruction to switch from the simple detection mode to the detailed detection mode, the communications unit 14 sends the generated instruction to the corresponding detector 2, the number of times requiring caution nc in the detailed detection mode is set to 0 (nc=0), and the process proceeds to step S5.

In step S5, the detector 2 performs the detection operation of the detailed detection mode, and those detection results (only regarding vibration) are sent to the central management apparatus 3. Thereafter, the process proceeds to step S6.

In step S6, the diagnosis unit 16 of the central management apparatus 3 performs diagnosis regarding the vibration detection results that have been sent from the detector 2 that performs the detection operation of the detailed detection mode. When diagnosed that the operating state of the steam trap 1 is a normal state based on the vibration detection results, the instruction generation unit 19 generates an instruction to switch from the detailed detection mode to the simple detection mode, the communications unit 14 sends the generated instruction to the corresponding detector 2, and the process returns to step S1. When diagnosed that the operating state of the steam trap 1 is a state requiring caution based on the vibration detection results, the process proceeds to step S7.

In step S7, 1 is added to the number of times requiring caution nc in the detailed detection mode (nc=nc+1), and the process proceeds to step S8. In step S8, if the number of times requiring caution nc after addition is lower than the number of times of abnormality recognition na (nc<na), the process returns to step S5, and detection/diagnosis of the detailed detection mode are repeated. If the number of times requiring caution nc after addition is equal to the number of times of abnormality recognition na (nc=na), the operating state of the steam trap 1 is diagnosed to be an abnormal state, and the process proceeds to step S9.

In step S9, the instruction generation unit 19 generates an instruction to stop the detection operation, the communications unit 14 sends the generated instruction to the corresponding detector 2, and the above-described alarm is performed.

As described above, with this equipment monitoring system, although power consumption is basically suppressed by performing a detection operation in the simple detection mode in which a momentary detection operation is performed, only in a case where the result of diagnosis in the simple detection mode is that the operation state is a state requiring caution, a detection operation is performed in the detailed detection mode in which power consumption is increased due to a continuous detection operation, so overall power consumption of the detector is effectively suppressed. Also, even if reliability of diagnosis is insufficient in the simple detection mode, ultimately, the detection operation in the detailed detection mode is performed and those detection results are diagnosed in detail, so it is possible to reliably diagnose whether the operating state of the steam trap 1 is a normal state or an abnormal state.

Also, temperature, regarding which detection results are unlikely to vary, and vibration, regarding which detection results are more likely to vary, are each diagnosed with different patterns of diagnosis. Regarding temperature, reliable diagnosis is performed by only diagnosis in the simple detection mode, and a detection operation and diagnosis in the detailed detection mode are omitted, thereby suppressing power consumption. Regarding vibration, although power consumption is suppressed by basically performing a detection operation in the simple detection mode, ultimately diagnosis based on the detection results in the detailed detection mode is performed, so sufficiently reliable diagnosis is possible. Therefore, even when respective diagnosis is performed based on the detection results of temperature and vibration, detector power consumption can be suppressed, and the operating state of monitored equipment can be reliably diagnosed.

Other Embodiments

In the above embodiment, the detection results detected by each detector 2 are sent to the central management apparatus 3, the operating states of the steam traps 1 are diagnosed by the central management apparatus 3, switching of the detection operation mode is judged according to the results of that diagnosis, and switching instructions are sent to each detector 2. However, this is not a limitation, and a configuration may also be adopted in which diagnosis of the operating state of the monitored steam trap 1, and judgment of switching of the detection operation mode, are performed in the digital circuit unit 9 of the detector 2.

In this case, the detected detection results and the results of diagnosis of the operating state of the steam trap 1 can be sent to the central management apparatus 3 every time detection or diagnosis are performed, or only when the operating state of the monitored steam trap has been diagnosed to be an abnormal state. Also, a configuration may be adopted in which detection results and diagnosis results are cumulatively stored in the storage unit 13 of the detector 2, and diagnosis results and detection results are acquired from the storage unit 13 of the detector 2 at an appropriate time by communications using the central management apparatus 3 or another mobile terminal. Also, a configuration may be adopted in which an alarm unit is separately provided in the detector 2, and when the operating state of the monitored steam trap has been diagnosed to be an abnormal state, an alarm is issued by the alarm unit.

The operation time and the time interval of the detection operation in each detection operation mode, the operation of the input switching switch circuit 8*a* (that is, which of temperature and vibration to detect), and the timing of the communications operation, are not limited to those described in the above embodiment, and for example, in the repetition of detection/diagnosis in the detailed detection mode in steps S5 to S8 in FIG. 5, the operation time of the detection operation in each repetition may be appropriately modified as necessary, for example by increasing or decreasing the operation time.

In the above embodiment, a configuration is adopted in which, as in step S6 in the flowchart in FIG. 5, when the operating state of the steam trap 1 is diagnosed to be a normal state in the repetition of diagnosis in the detailed detection mode, an instruction to switch from the detailed detection mode to the simple detection mode is sent to the corresponding detector 2, and then the process returns to step S1, but this is not a limitation. A configuration may also be adopted in which, even when the operating state of the steam trap 1 is diagnosed to be a normal state, continuation of the detailed detection mode is instructed, the process proceeds to step 5, and the detection operation in the detailed detection mode is continued.

In this case, when the operating state of the steam trap 1 is diagnosed to be a normal state, the number of times requiring caution nc may be reset to 0 (nc=0). Also, a configuration may be adopted in which the diagnosis unit 16 counts a number of times of diagnosis n in the detailed detection mode for each diagnosis, and when the number of times of diagnosis n reaches a predetermined number of times of diagnosis ending of before the number of times requiring caution nc reaches the number of times of abnormality recognition na in step S7, an instruction to switch from the detailed detection mode to the simple detection mode is sent to the corresponding detector 2, and then the process returns to step S1.

Also, the diagnosis of the operating state of the steam trap 1 in this equipment monitoring system may be performed according to the flowchart shown in FIG. 6, for example. Steps S1' to S3' and step S10' in the flowchart in FIG. 6 are the same as steps S1 to S3 and step S9 in the flowchart in FIG. 5, and steps S4' to S9' are as follows.

In step S4', the instruction generation unit 19 generates an instruction to switch from the simple detection mode to the detailed detection mode, the communications unit 14 sends the generated instruction to the corresponding detector 2, the number of times of diagnosis n and the number of times requiring caution nc in the detailed detection mode are set to 0 (n=0, nc=0), and the process proceeds to step S5'.

In step S5', the detector 2 performs the detection operation of the detailed detection mode, and those detection results (only regarding vibration) are sent to the central management apparatus 3. Thereafter, the process proceeds to step S6'.

In step S6', the diagnosis unit 16 of the central management apparatus 3 performs diagnosis regarding the vibration detection results that were sent from the detector 2 that performs the detection operation in the detailed detection mode. In step S6', when the operating state of the steam trap 1 has been diagnosed to be a normal state, the process proceeds to step S7*a*', 1 is added to the number of times of diagnosis in the detailed detection mode (n=n+1), and the process proceeds to step S8'. In step S6', when the operating state of the steam trap 1 has been diagnosed to be a state requiring caution, the process proceeds to step S7*b*', 1 is added to the number of times of diagnosis n in the detailed detection mode (n=n+1), 1 is added to the number of times requiring caution nc in the detailed detection mode (nc=nc+1), and the process proceeds to step S8'.

In step S8', if the number of times of diagnosis n is less than the predetermined number of times of diagnosis ending nf (n<nf), the process returns to step S5', and detection and diagnosis in the detailed detection mode are repeated.

Also, if the number of times of diagnosis n is equal to the predetermined number of times of diagnosis ending nf (n=nf), the process proceeds to step S9'.

In step S9', the number of times requiring caution nc is compared to the number of times of abnormality recognition na. If the number of times requiring caution nc is lower than the number of times of abnormality recognition na (nc<na), the operating state of the steam trap 1 is diagnosed to be a normal state, the communications unit 14 of the central management apparatus 3 sends an instruction to switch from the detailed detection mode to the simple detection mode to the corresponding detector 2, and then the process returns to step S1. If the number of times requiring caution nc is at least the number of times of abnormality recognition na (nc>na), the operating state of the steam trap 1 is diagnosed to be a normal state, and the process proceeds to step S10'.

The number of times of abnormality recognition na in the flowchart in FIG. 5 can be appropriately set as required, and may be set to any number of 1 or more. Regarding also the number of times of abnormality recognition na and the number of times of diagnosis ending nf in the flowchart of FIG. 6, any number of 1 or more may be used as long as the number of times of abnormality recognition na does not exceed the number of times of diagnosis ending nf. Note that if the number of times of abnormality recognition na and the number of times of diagnosis ending nf are both set to 1 in the flowcharts in FIGS. 5 and 6, diagnosis of a normal state/abnormal state of the operating state of the steam trap 1 will be performed with one instance of detection/diagnosis in the detailed detection mode, without repeated detection/diagnosis in the detailed detection mode.

In the above embodiment, the pattern of detection operation in the detector in the detailed detection mode is such that a detection operation is suspended after performing a continuous detection operation for a predetermined time period, and the detection operation is resumed after an instruction from the central management apparatus 3. However, this is not a limitation, and a configuration may also be adopted in which a continuous detection operation is constantly performed without pausing after a detection operation.

A configuration may also be adopted in which in diagnosis of the operating state of the steam trap 1 in the detailed detection mode, the operating state of the steam trap 1 is diagnosed to be an abnormal state when the detection results are always abnormal values during the continuous detection operation for a fixed time in the detector 2, and the operating state of the steam trap 1 is diagnosed to be an abnormal state when the detection results returned to a normal value during the continuous detection operation.

In the above embodiment, the monitored equipment of this equipment monitoring system is a steam trap, this is not a limitation, and the monitored equipment may be a valve, a pump, a turbine, a heat exchanger, a tank, or the like, and the present disclosure is applicable to monitoring of various equipment.

In the above embodiment, a total of two detectors 2 are provided on the entrance side and the exit side of the connecting member 5, but this is not a limitation, and a single detector 2 may be provided on any one of the entrance side and the exit side of the connecting member 5.

In the above embodiment, the detector 2 includes both the temperature sensor 6 and the vibration sensor 7 as sensors, but this is not a limitation, and a configuration may also be adopted in which only the temperature sensor 6 or the vibration sensor 7 is included, or instead, various sensors such as a pressure sensor, a sound sensor, or the like may be adopted depending on the monitored equipment or purpose.

INDUSTRIAL APPLICABILITY

The equipment monitoring system of the present disclosure is applicable to monitoring of equipment that can be installed in various plants, factories, or the like in various fields.

DESCRIPTION OF REFERENCE SIGNS

1: monitored equipment (steam trap)
2: detector
9: control unit (digital circuit unit)
14: alarm unit (communications unit)
16: diagnosis unit

The invention claimed is:

1. An equipment monitoring system having a detector that detects at least one physical quantity of a monitored equipment including a steam trap, and a diagnosis unit that diagnoses an operating state of the monitored equipment based on the at least one physical quantity detected by the detector, the equipment monitoring system comprising:
a control unit that switches a detection operation mode of the detector between a simple detection mode in which the detector periodically performs a momentary detection operation having an operation time, and a detailed detection mode in which the detector performs a continuous detection operation having a longer operation time than each operation time of each instance of the momentary detection operation in the simple detection mode;
wherein the diagnosis unit is configured to, in the simple detection mode, diagnose whether the operating state of the monitored equipment is a normal state or a state requiring caution based on the momentary detection operation, and
the control unit is configured to, in the simple detection mode, when the diagnosis unit has diagnosed the operating state of the monitored equipment to be the normal state, maintain the simple detection mode, and when the diagnosis unit has diagnosed the operating state of the monitored equipment to be the state requiring caution, switch the detection operation mode of the detector from the simple detection mode to the detailed detection mode,
wherein the detector, in the simple detection mode, performs each momentary detection operation to detect the at least one physical quantity during each operation time between time intervals in which the momentary detection operation is not performed to detect the at least one physical quantity, and wherein the detector, in the detailed detection mode, performs the continuous detection operation to constantly detect the at least one physical quantity without pausing the continuous detection operation during the longer operation time to not detect the at least one physical quantity,
wherein the at least one physical quantity includes at least one first physical quantity and at least one second physical quantity different than the at least one first physical quantity, wherein the detector is configured to detect the at least one first physical quantity and the at least one second physical quantity different than the at least one first physical quantity, wherein the at least one first physical quantity includes temperature, wherein the at least one second physical quantity includes ultrasonic vibration or sound,
wherein the diagnosis unit is configured to, in the simple detection mode, diagnose whether the operating state of the monitored equipment is the normal state or an abnormal state different than the normal state and the state requiring caution based on the at least one first physical quantity, and wherein, only when the diagnosis unit has diagnosed the operating state of the monitored equipment to be the normal state based on the at least one first physical quantity, the diagnosis unit is configured to diagnose whether the operating state of the monitored equipment is the normal state or the state requiring caution based on the at least one second physical quantity, and
wherein the control unit is configured to, in the simple detection mode, when the diagnosis unit has diagnosed the operating state of the monitored equipment to be the normal state based on the at least one second physical quantity, maintain the simple detection mode, and wherein, when the diagnosis unit has diagnosed the operating state of the monitored equipment to be the state requiring caution based on the at least one second physical quantity, switch the detection operation mode of the detector from the simple detection mode to the detailed detection mode.

2. The equipment monitoring system according to claim 1, wherein the diagnosis unit is configured to, in the detailed detection mode, repeatedly diagnose whether the operating state of the monitored equipment is the normal state or the state requiring caution based on the continuous detection operation in a predetermined time period, and when the operating state of the monitored equipment is diagnosed to be the state requiring caution for a predetermined number of times of abnormality recognition consecutively in this repetition, diagnose that the operating state of the monitored equipment is the abnormal state different than the normal state and the state requiring caution.

3. The equipment monitoring system according to claim 2, wherein the control unit is configured to, in the repetition of diagnosis by the diagnosis unit in the detailed detection mode, when the diagnosis unit has diagnosed the operating state of the monitored equipment to be the normal state, switch the detection operation mode of the detector from the detailed detection mode to the simple detection mode.

4. The equipment monitoring system according to claim 1, wherein the diagnosis unit is configured to, in the detailed detection mode, repeatedly diagnose whether the operating state of the monitored equipment is the normal state or the state requiring caution based on the continuous detection operation in a predetermined time period, and when, after a predetermined number of times of diagnosis have been performed in this repetition, a number of times that the operating state of the monitored equipment has been diagnosed to be the state requiring caution is at least a predetermined number of times of abnormality recognition, diagnose that the operating state of the monitored equipment is the abnormal state different than the normal state and the state requiring caution.

5. The equipment monitoring system according to claim 1, wherein the diagnosis unit is configured to, in the simple detection mode, diagnose the operating state of the monitored equipment based on the at least one first physical quantity detected in one instance of detection operation, and diagnose the operating state of the monitored equipment based on a moving average of the at least one second physical quantity detected in a plurality of instances of detection operation.

6. The equipment monitoring system according to claim 1, wherein the diagnosis unit is configured to diagnose the operating state of the monitored equipment based on a size relationship of the at least one first physical quantity to a predetermined threshold value.

7. The equipment monitoring system according to claim 6, wherein the predetermined threshold value is set to a maximum value or a minimum value of the at least one first physical quantity detected by the detector in a test operation of the detector.

8. The equipment monitoring system according to claim 6, wherein the predetermined threshold value is set for the detector based on a range of variation in the at least one first physical quantity detected in a fixed period in an initial operation of the detector.

9. The equipment monitoring system according to claim 8, wherein the predetermined threshold value is updated at a time determined based on the range of variation in the at least one first physical quantity detected in another fixed period during operation of the detector other than the initial operation of the detector.

10. The equipment monitoring system according to claim 1, comprising an alarm unit that issues an alarm when the operating state of the monitored equipment is diagnosed to be the abnormal state by the diagnosis unit different than the normal state and the state requiring caution.

11. A computer program product comprising at least one non-transitory computer-readable medium including program instructions for causing a detector to detect at least one physical quantity of a monitored equipment including a steam trap, and causing a diagnosis unit to diagnose an operating state of the monitored equipment based on the at least one physical quantity detected by the detector, that, when executed by at least one processor, cause the at least one processor to:

cause the detector to perform a detection operation of a simple detection mode in which a momentary detection operation having an operation time is periodically performed; and cause the diagnosis unit to diagnose whether the operating state of the monitored equipment is a normal state or a state requiring caution based on the momentary detection operation;

wherein when the diagnosis unit has diagnosed the operating state of the monitored equipment to be the normal state, the simple detection mode is maintained and the detector is caused to periodically perform the momentary detection operation having the operation time, and when the diagnosis unit has diagnosed the operating state of the monitored equipment to be the state requiring caution, the detection operation mode of the detector is switched from the simple detection mode to a detailed detection mode in which a continuous detection operation having a longer operation time than each operation time of each instance of the momentary detection operation in the simple detection mode is performed by the detector, wherein, in the simple detection mode, the detector is caused to perform each momentary detection operation to detect the at least one physical quantity during each operation time between time intervals in which the momentary detection operation is not performed to detect the at least one physical quantity, and wherein, in the detailed detection mode, the detector is caused to perform the continuous detection operation to constantly detect the at least one physical quantity without pausing the continuous detection operation during the longer operation time to not detect the at least one physical quantity, wherein the at least one physical quantity includes at least one first physical quantity and at least one second physical quantity different than the at least one first physical quantity, wherein the detector is caused to detect the at least one first physical quantity and the at least one second physical quantity different than the at least one first physical quantity, wherein the at least one first physical quantity includes temperature, wherein the at least one second physical quantity includes ultrasonic vibration or sound, wherein the diagnosis unit is caused to, in the simple detection mode, diagnose whether the operating state of the monitored equipment is the normal state or an abnormal state different than the normal state and the state requiring caution based on the at least one first physical quantity, and wherein, only when the diagnosis unit has diagnosed the operating state of the monitored equipment to be the normal state based on the at least one first physical quantity, the diagnosis unit is caused to diagnose whether the operating state of the monitored equipment is the normal state or the state requiring caution based on the at least one second physical quantity, and wherein the control unit is caused to, in the simple detection mode, when the diagnosis unit has diagnosed the operating state of the monitored equipment to be the normal state based on the at least one second physical quantity, maintain the simple detection mode, and wherein, when the diagnosis unit has diagnosed the operating state of the monitored equipment to be the state requiring caution based on the at least one second physical quantity, switch the detection operation mode of the detector from the simple detection mode to the detailed detection mode.

12. An equipment monitoring method of detecting at least one physical quantity of a monitored equipment including a steam trap with a detector, and diagnosing an operating state of the monitored equipment based on the at least one physical quantity detected by the detector, the equipment monitoring method comprising:

performing, with the detector, a detection operation of a simple detection mode in which a momentary detection operation having an operation time is periodically performed; and diagnosing whether the operating state of the monitored equipment is a normal state or a state requiring caution based on the momentary detection operation;

wherein, when the operating state of the monitored equipment has been diagnosed to be the normal state, the simple detection mode is maintained and the momentary detection operation is periodically performed by the detector, and wherein, when the operating state of the monitored equipment has been diagnosed to be the state requiring caution, the detection operation mode of the detector is switched from the simple detection mode to a detailed detection mode in which a continuous detection operation having a longer operation time than each operation time of each instance of detection operation in the simple detection mode is performed by the detector, wherein, in the simple detection mode, each momentary detection operation is performed, with the detector, to detect the at least one physical quantity during each operation time between time intervals in which the momentary detection operation is not performed to detect the at least one physical quantity, and wherein, in the detailed detection mode, the continuous detection operation is performed, with the detector, to constantly detect the at least one physical quantity without pausing the continuous detection operation during the longer operation time to not detect the at least one physical quantity, wherein the at least one physical quantity includes at least one first physical quantity and at least one second physical quantity different than the at least one first physical quantity, wherein the detector is configured to detect the at least one first physical quantity and the at least one second physical quantity different than the at least one first physical quantity, wherein the at least one first physical quantity includes temperature, wherein the at least one second physical quantity includes ultrasonic vibration or sound, wherein, in the simple detection mode, whether the operating state of the monitored equipment is the normal state or an abnormal state different than the normal state and the state requiring caution is diagnosed based on the at least one first physical quantity, and wherein, only when the operating state of the monitored equipment is diagnosed to be the normal state based on the at least one first physical quantity, whether the operating state of the monitored equipment is the normal state or the state requiring caution is diagnosed based on the at least one second physical quantity, and wherein, in the simple detection mode, when the operating state of the monitored equipment is diagnosed to be the normal state based on the at least one second physical quantity, the simple detection mode is maintained, and wherein, when the operating state of the monitored equipment is diagnosed to be the state requiring caution based on the at least one second physical quantity, the detection operation mode of the detector is switched from the simple detection mode to the detailed detection mode.

* * * * *